United States Patent

Yamaguchi

[11] Patent Number: 5,906,886
[45] Date of Patent: *May 25, 1999

[54] AROMATIC POLYIMIDE ARTICLE HAVING AMORPHOUS LAYER

[75] Inventor: Hiroaki Yamaguchi, Chiba, Japan

[73] Assignee: Ube Industries, Ltd., Yamaguchi, Japan

[*] Notice: This patent is subject to a terminal disclaimer.

[21] Appl. No.: 08/867,369

[22] Filed: Jun. 2, 1997

[30] Foreign Application Priority Data

May 31, 1996 [JP] Japan .................................. 8-138552

[51] Int. Cl.$^6$ .............................. B32B 7/02; B32B 15/08; C08G 73/10

[52] U.S. Cl. ......................... 428/215; 428/213; 428/216; 428/220; 428/336; 428/337; 428/458; 428/473.5

[58] Field of Search ................................. 428/473.5, 213, 428/215, 216, 336, 337, 458, 220

[56] References Cited

U.S. PATENT DOCUMENTS 5,741,598   4/1998   Shiotani et al. ........................ 428/458

*Primary Examiner*—D. S. Nakarani
*Attorney, Agent, or Firm*—McAulay Nissen Goldberg Kiel & Hand, LLP

[57] ABSTRACT

An aromatic polyimide crystalline article and a thin amorphous aromatic polyimide film having a thickness of not more than 1.5 μm are inseparably combined to each other to give an aromatic polyimide article having a high mechanical strength and an active surface which is favorably employable for receiving a metal vapor deposition, sputtered metal, or an adhesive.

10 Claims, No Drawings

5,906,886

AROMATIC POLYIMIDE ARTICLE HAVING AMORPHOUS LAYER

FIELD OF THE INVENTION

The present invention relates to an aromatic polyimide article having a thin amorphous aromatic polyimide layer on its surface. The invention particularly relates to an aromatic polyimide film having a thin amorphous aromatic polyimide layer on its surface.

BACKGROUND OF THE INVENTION

An aromatic polyimide article such as an aromatic polyimide film is known to have high heat resistance and high mechanical strength and therefore is widely employed, for instance, as a substrate of electronic device for incorporation into camera, personal computer, or liquid crystal display. The aromatic polyimide article has, however, such disadvantageous features that a conventional adhesive is not well fixed to its surface and further a spattered or vacuum deposited metal layer is not formed on its surface with enough bonding strength.

Japanese Patent Provisional Publications No. 59-86634 and No. H2-134241 describe that a surface of an aromatic polyimide film can be treated with plasma discharge to increase its adhesion to other material. The plasma discharge treatment is disadvantageous for industrial use because its gives poor productivity. Moreover, the increase of the adhesion property is not satisfactory.

U.S. Pat. No. 5,151,304 describes that the surface of a substrate made of substantially crystalline polyimide is converted to form a layer of substantially amorphous polyimide by treating the crystalline polyimide surface wit a base followed by treatment with an acid to form polyamic acid layer, which is reimidized to form a substantially amorphous layer by a low temperature heat cycle, and metals or polyimides can be deposited onto this amorphous layer, which is then cured to convert the amorphous layer to substantially crystalline polyimide. The United States Patent further describes that the process enhances the adhesion of the metal or polyimide layer. In the working examples, it is disclosed that a film of an aromatic polyimide having a pyromellitic acid unit as aromatic tetracarboxylic acid unit is satisfactorily treated in that manner to give an enhanced adhesion to other aromatic polyimide.

According to studies by the present inventors, the above treatments to form an amorphous polyimide surface are not applicable for forming an amorphous polyimide surface on an aromatic polyimide film having a biphenyltetracarboxylic acid unit as aromatic tetracarboxylic acid unit. Moreover, the curing for converting the amorphous polyimide surface to a crystalline polyimide surface after metals or other polyimides are deposited sometimes lowers the quality of the resultant composite film.

U.S. Pat. No. 5,262,227 describes an aromatic polyimide composite comprising two different kinds of aromatic polyimides arranged in united layers by simultaneous extrusion. One aromatic polyimide layer is derived from an aromatic polyamide acid comprising a tetracarboxylic acid unit and a phenylene diamine unit, while another aromatic polyimide layer is derived from an aromatic polyamide acid comprising a tetracarboxylic acid unit and an aromatic diamine unit having plural benzene rings. The surface of the latter polyimide layer is stated to show good adhesion to a metal film when they are combined under pressure at 280°–550° C.

The copending U.S. patent application Ser. No. 08/690, 107, now U.S. Pat. No. 5,741,598, describes a polyimide/metal composite sheet in which the polyimide sheet generally comprises an aromatic polyimide substrate having a thickness of 15 to 150 μm and an aromatic polyimide coat having a thickness of 2 to 10 μm. The aromatic polyimide of the substrate comprises 3,3',4,4'-beiphenyltetracarboxylic acid unit, and the aromatic polyimide of the polyimide coat comprises 2,3,3',4'-biphenyltetracarboxylic acid unit.

SUMMARY OF THE INVENTION

It has been now discovered that an aromatic polyimide crystalline article and a thin amorphous aromatic polyimide film having a thickness of not more than 1.5 μm are combined to each other to give an aromatic polyimide article having a high mechanical strength and an active surface which is favorably employable for receiving a metal vapor deposition or a conventional adhesive.

The present invention resides in an aromatic polyimide article such as an aromatic polyimide film having a thickness of not less than 10 μm and comprising a crystalline aromatic polyimide article and an amorphous aromatic polyimide layer coated on the crystalline polyimide article, said amorphous polyimide layer having a thickness of 0.1 to 1.5 μm, preferably, 0.1 to 1.0 μm, more preferably 0.5 to 1.0 μm, and having an aromatic tetracarboxylic acid unit which differs from an aromatic tetracarboxylic acid unit of the crystalline aromatic polyimide article.

The terms of "crystalline polyimide" and "amorphous polyimide" used herein mean a polyimide showing crystalline structure by X-ray diffraction measurement and a polyimide showing no crystalline structure by X-ray diffraction measurement, respectively. The crystalline polyimide preferably has a degree of crystallinity of not less than 5%, more preferably not less than 10%. This value is obtained by X-ray diffraction (wide angle X-ray diffraction) and using the Ruland method.

The surface of the amorphous polyimide layer is appropriately employable for receiving metal vapor deposition, metal sputtering or a conventional adhesive.

DETAILED DESCRIPTION OF THE INVENTION

Preferred embodiments of the invention are described below.

1) The aromatic polyimide article of the invention, wherein the crystalline polyimide article and the amorphous polyimide layer are combined on their surfaces under the condition that a portion of polyimide molecules of the amorphous polyimide is anchored in the crystalline polyimide article.

2) The aromatic polyimide article of the invention wherein the crystalline polyimide article is a film having a thickness of 10 to 150 μm.

3) The aromatic polyimide article of the invention wherein the crystalline polyimide article is a film having a thickness of 10 to 150 μm and the amorphous polyimide layer has a thickness of 0.1 to 1.0 μm.

4) The aromatic polyimide article of the invention wherein the crystalline aromatic polyimide article comprises an aromatic tetracarboxylic acid unit at least 15 molar % of which is 3,3',4,4'-biphenyltetracarboxylic acid unit and an aromatic diamine unit at least 10 molar % of which is 1,4-diaminobenzene unit.

5) The aromatic polyimide article of the invention wherein the amorphous aromatic polyimide layer comprises an aromatic tetracarboxylic acid unit consisting essentially of at least one of 2,3,3',4'-biphenyltetracarboxylic acid unit, 2,2-bis(3,4-dicarboxy)phenyl propane unit and bis(3,4-dicarboxyphenyl)ether unit, and an aromatic diamine unit consisting essentially of at least one of 1,3-bis(4-aminophenoxy)benzene, 1,4-di-aminobenzene, 4,4'-diaminodiphenyl ether, 1,3-bis(3-aminophenoxy) benzene, 4,4'-bis(4-aminophenoxy)diphenylsulfone and 2,2-bis(4-aminophenoxyphenyl)propane.

6) The aromatic polyimide article of the invention wherein the amorphous aromatic polyimide layer comprises an aromatic tetracarboxylic acid unit at least 70 molar % of which is 2,3,3',4'-biphenyltetracarboxylic acid unit and an aromatic diamine unit selected from the group consisting of 1,3-bis(4-aminophenoxy) benzene, 1,4-diaminobenzene, 4,4'-diaminodiphenyl ether, 4,4'-bis(4-aminophenoxy)diphenylsulfone and 2,2-bis(4-aminophenoxyphenyl) propane.

7) The aromatic polyimide article of the invention which is prepared by coating a solution of an aromatic polyamide acid from which the amorphous polyimide is produced, on a self-supporting article of an aromatic polyamide acid from which the crystalline polyimide is produced, to form a coated article, and heating the coated article to convert both polyamide acids into polyimides.

8) A composite composed of an aromatic polyimide article of the invention and a metal film formed on the amorphous polyimide layer of the polyimide article by vacuum deposition or sputtering.

9) A composite composed of an aromatic polyimide article of the invention and a metal film placed on the amorphous polyimide layer of the polyimide article via an adhesive layer.

The aromatic polyimide employed for the preparation of the crystalline polyimide article preferably comprises at least 15 molar %, preferably at least 55 molar %, more preferably at least 70 molar %, of 3,3',4,4'-biphenyltetracarboxylic acid unit and at least 10 molar %, preferably at least 30 molar %, more preferably at least 55 molar %, of 1,4-diaminobenzene unit. The 3,3',4,4'-biphenyltetracarboxylic acid unit can be incorporated in combination with other aromatic tetracarboxylic acid units such as pyromellitic acid unit. The 3,3',4,4'-biphenyltetracarboxylic acid unit can be derived from 3,3',4,4'-biphenyltetracarboxylic acid dianhydride, and pyromellitic acid unit can be derived from pyromellitic acid dianhydride. The 1,4-diaminobenzene unit can be incorporated in combination with other aromatic diamine compounds such as 4,4'-diaminodiphenyl ether.

One of representative aromatic polyimides for the crystalline polyimide article is an aromatic polyimide comprising, as the tetracarboxylic acid units, 3,3',4,4'-biphenyltetracarboxylic acid unit and pyromellitic acid unit, and as the diamine unit, 1,4-diaminobenzene. The diamine unit can be a combination of 1,4-diaminobenzene and 4,4'-diamindienl ether.

Alternatively, an aromatic polyimide comprising the pyromellitic acid unit and 4,4'-diaminodiphenyl ether can be employed for the preparation of the crystalline polyimide article. The diamine unit can be a combination of 1,4-diaminobenzene and 4,4'-diaminodiphenyl ether.

The crystalline aromatic polyimide can be prepared from an aromatic tetracarboxylic acid dianhydride and a aromatic diamine by conventional methods. For instance, the aromatic tetracarboxylic acid dianhydride and the aromatic diamine in almost equimolar amounts are reacted to give a polyamide acid, and the polyamide acid is then heated to a high temperature to give a polyimide. The polyimide may be a random polymer or block polymer. Any other modified preparation methods can be employed.

The amorphous polyimide, that is, a polyimide which gives a spectrum showing no crystalline structure according to X-ray diffraction spectroscopy, is obtained from a polyamide acid which has a chemical structure differing from the polyamide acid which is turned to give the crystalline polyimide. The amorphous polyimide can be prepared from 2,3,3',4'-biphenyltetracarboxylic acid unit, 2,2-bis(3,4-dicarboxy)phenylpropane unit and/or bis(3,4-dicarboxyphenyl) ether unit, and 1,3-bis(4-aminophenoxy) benzene, 1,4-diaminobenzene, 4,4'-diaminodiphenyl ether, 1,3-bis(3-aminophenoxy)benzene, 4,4'-bis(4-aminophenoxy)diphenylsulfone and/or 2,2-bis(4-aminophenoxyphenyl)propane. A portion (e.g., 40 to 90 molar %) of the diamine may be replaced with diamnopolysiloxane, if desired.

A preferred amorphous aromatic polyimide comprises 70 molar % or more 2,3,3',4'-biphenyltetracarboxylic acid unit and an aromatic diamine unit such as 1,3-bis (4aminophenoxy)benzene, 1,4-diaminobenzene, 4,4'-diaminodiphenyl ether, 4,4'-bis(4-aminophenoxy) diphenylsulfone or 2,2-bis(4-aminophenoxyphenyl) propane. The most preferred amorphous aromatic polyimide is prepared from 2,3,3',4'-biphenyltetracarboxylic acid dianhydride and an aromatic diamine.

The terminal amine group of the amorphous polyimide may be capped with dicarboxylic acid anhydride such as phthalic anhydride, hexahydrophthalic anhydride or succinic anhydride.

The crystalline aromatic polyimide film having on its surface the amorphous aromatic polyimide layer can be prepared, for example, by the following process.

An aromatic tetracarboxylic acid dianhydride such as 3,3',4,4'-biphenyltetracarboxylic acid dianhydride and an aromatic diamine are reacted in an organic solvent to give a polyamide acid solution. The organic solvent can be N-methyl-2-pyrrolidone, N,N-dimethylformamide, N,N-dimethylacetamide, or N,N-diethylacetamide. The solvent can be a mixture of these organic solvents. The polyamide acid solution preferably has a polyamide acid concentration of 8 to 25 weight %. The polyamide acid solution may contain known additives and known auxiliary material such as an inorganic filler. The polyamide acid solution is, after addition of a chemical imidizing agent if desired, spread on a temporary substrate such as stainless steel plate, stainless steel belt, glass plate, and heated, for instance, to 100to 180° C. for 5 to 60 minutes, to give a self-supporting polyamide acid film.

The self-supporting polyamide acid film preferably has a thickness to give a crystalline aromatic polyimide film having a thickness of 10 to 150 μm after curing.

Over thus obtained self-supporting polyamide film is coated an aromatic polyamide acid solution for forming the amorphous polyimide layer to give a polymer layer of 0.1 to 1.5 μm, preferably 0.1 to 1.0 μm, more preferably 0.5 to 1.0 μm (thickness after imidization).

The polyamide acid solution for forming the amorphous aromatic polyimide can be prepared, for instance, from 2,3,3',4'-biphenyltetracarboxylic acid dianhydride and an aromatic diamine in an organic solvent. The solvent can be the same as or different from that employed for the preparation of the polyamide acid solution for A crystalline polyimide film. The polyamide acid solution preferably has a polyamide acid concentration of 0.1 to 5 weight %. The polyamide acid solution may contain known additives and known auxiliary material such as an inorganic filler.

The coating is performed by a known coating method, such as dipping, screen printing, curtain roll, reverse roll, or gravure coater.

The self-supporting polyamide acid film coated with the above polyamide acid solution was then heated, for instance, to 350–500° C. for curing both polyamide acids. Thus cured polyamide acids give an aromatic polyimide film comprising a crystalline aromatic polyimide film and an amorphous aromatic polyimide layer coated on the crystalline polyimide film. The amorphous polyimide layer has a thickness of 0.1 to 1.5 $\mu$m and has an aromatic tetracarboxylic acid unit which differs frond an aromatic tetracarboxylic-acid unit of the crystalline aromatic polyimide film. Preferably, the crystalline polyimide film and the amorphous polyimide layer are combined on their surfaces under the condition that a portion of polyimide molecules of the amorphous polyimide is anchored in the crystalline polyimide film.

The amorphous polyimide layer of the above-obtained film can favorably receive thereon sputtered metal or an adhesive. On the adhesive, a metal film such as copper film can be easily fixed. The deposition of a metal layer on the amorphous polyimide layer directly or via an adhesive can be performed, for instance, by referring to "Handbook of Printed Circuit Technology (in Japanese)" (Nikkan Kogyo Sinbunsha, 1993).

The present invention is further described by the following examples.

EXAMPLE 1

1) Preparation of multi-layered polyimide film

A dope solution of a polyamide acid (for the preparation of a crystalline polyimide film, polyamide acid concentration: 18 wt.%, solvent: dimethylacetamide, which was prepared from 3,3',4,4'-biphenyltetracarboxylic acid dianhydride and 1,4-diaminobenzene) was spread on a stainless steel plate, and heated to 150° C. for 10 minutes. Thus prepared self-supporting polyamide acid film was separated from the plate.

On the self-supporting polyamide acid film was coated a separately prepared polyamide acid solution [for the preparation of an amorphous polyimide layer, polyamide acid concentration: 2 wt.%, solvent: dimethylacetamide, which was prepared from 2,3,3',4'-biphenyltetracarboxylic acid dianhydride and 1,3-bis(4-aminophenoxy)benzene]. Thus coated self-supporting polyamide acid film was heated to 200° C. for 3 minutes, 300° C. for 3 minutes, and finally 400° C. for 4 minutes, to give a multi-layered polyimide film composed of a thick polyimide substrate film of 25 $\mu$m thick coated with a thin polyimide layer of approximately 0.6 $\mu$m thick.

Separately, each of the polyamide acid solutions was coated on a stainless steel plate and processed under the conditions described above to give an aromatic polyimide film of 25 $\mu$m for each polyamide acid solution. The polyimide film prepared from 3,3',4,4'-biphenyltetracarboxylic acid dianhydride and 1,4-diaminobenzene gives an X-ray diffraction spectrum showing a degree of crystallinity of approximately 21%, while the polyimide film prepared from 2,3,3',4'-biphenyltetracarboxylic acid dianhydride and 1,3-bis(4-aminophenoxy)benzene gives an X-ray diffraction spectrum showing no crystallinity. The X-ray diffraction spectroscopy was performed by a wide angle X-ray diffraction method, and analysis of the data was done according to the Ruland method.

2) Production of copper foil-laminated film

An electrolytic copper foil (3EC-3, available from Mitsui Metal Mining Co., Ltd.) was coated with an adhesive layer (30 $\mu$m thick, epoxy adhesive TE-5701, available from Toray Industries, Inc.). The adhesive coated copper foil was heated to 13° C. for 10 minutes to dryness. On the adhesive layer was placed the multi-layered polyimide film under the condition that the amorphous polyimide layer was brought into contact with the adhesive layer. The combined films were placed for 5 minutes at 180° C. under pressure of 1 kg/cm$^2$, and then kept for 60 minutes in an air oven heated to 180° C., to give a copper foil-laminated polyimide film.

The peel strength (T peel, at 25° C.) of the obtained copper foil-laminated polyimide film was 2.2 kgf/cm.

3) Production of copper-deposited film

On the amorphous polyimide layer of the multi-layered polyimide film was deposited a copper metal layer of 1 $\mu$m thick by sputtering to give a sputtered copper-deposited polyimide film.

The obtained copper-deposited polyimide film was placed in a boiling water for one hour and then subjected to the cross-cut peeling test. The result was 100/100 (no peeling was observed).

Comparison Example 1

1) Production of copper foil-laminated film

A commercially available aromatic polyimide film (Upilex 25S, thickness: 25 $\mu$m, available from Ube Industries, Ltd.) was combined with a copper foil using an adhesive in the manner and under the conditions as described in Example 1. The peel strength of the obtained copper foil-laminated polyimide film was 0.6 kgf/cm.

2) Production of copper-deposited film

On the cotmmrcially available aromatic polyimide film (above Upilex 25) was deposited a copper metal layer of 1 $\mu$m thick in the manner and under the conditions as described in Example 1. The obtained copper-deposited polyimide film was placed in a boiling water for one hour and then subjected to the cross-cut peeling test. The result was 0/100 (peeling was observed over the whole surface).

EXAMPLE 2

1) Preparation of multi-layered polyimide film

The procedures of Example 1 were repeated except for using a polyamide acid solution (polyamide acid concentration: 2 wt. %, solvent: dimethylacetamide, which was prepared from 2,3,3',4'-biphenyltetracarboxylic acid dianhydride and 4,4'-bis(4-aminophenoxy)diphenylsulfone) for preparing an amorphous polyimide layer, to give a multi-layered polyimide film composed of a thick crystalline polyimide substrate film of 25 $\mu$m thick coated with a thin amorphous polyimide layer of approximately 0.6 $\mu$m thick.

2) Production of copper foil-laminated film

The above-obtained multi-layered polyimide film was combined with a copper foil using an adhesive in the manner and under the conditions as described in Example 1. The peel strength of the obtained copper foil-laminated polyimide film was 2.2 kgf/cm.

3) Production of copper-deposited film

On the above-obtained multi-layered polyimide film was deposited a copper metal layer of 1 $\mu$m thick in the manner and under the conditions as described in Example 1. The obtained copper-deposited polyimide film was placed in a boiling water for one hour and then subjected to the cross-cut peeling test. The result was 100/100 (no peeling was observed).

Comparison Example 2

1) Production of copper foil-laminated film

On a commercially available aromatic polyimide film (Upilex 25S, thickness: 25 μm, available from Ube Industries, Ltd.) was coated with the same polyamide acid solution as in Example 2 to form an amorphous polyimide layer. On the amorphous polyimide layer was fixed a copper foil using an adhesive in the manner and under the conditions as described in Example 1. The peel strength of the obtained copper foil-laminated polyimide film was 0.2 kgf/cm.

What is claimed is:

1. An aromatic polyimide article having a thickness of not less than 10 μm and comprising a crystalline aromatic polyimide article and an amorphous aromatic polyimide layer coated on the crystalline polyimide article, said amorphous polyimide layer having a thickness of 0.1 to 1.0 μm and having an aromatic tetracarboxylic acid unit which differs from an aromatic tetracarboxylic acid unit of the crystalline aromatic polyimide article.

2. The aromatic polyimide article of claim 1, wherein the crystalline polyimide article and the amorphous polyimide layer are combined on their surfaces under the condition that a portion of polyimide molecules of the amorphous polyimide is anchored in the crystalline polyimide article.

3. The aromatic polyimide article of claim 1, wherein the crystalline polyimide article is a film having a thickness of 10 to 150 μm.

4. The aromatic polyimide article of claim 1, wherein the crystalline polyimide article is a film having a thickness of 10 to 150 μm.

5. The aromatic polyimide article of claim 1, wherein the crystalline aromatic polyimide article comprises an aromatic tetracarboxylic acid unit at least 15 molar % of which is 3,3',4,4'-biphenyltetracarboxylic acid unit and an aromatic diamine unit at least 10 molar % of which is 1,4-diaminobenzene unit.

6. The aromatic polyimide article of claim 1, wherein the amorphous aromatic polyimide layer comprises an aromatic tetracarboxylic acid unit consisting essentially of at least one of 2,3,3',4'-biphenyltetracarboxylic acid unit, 2,2-bis(3,4-dicarboxy)phenylpropane unit and bis(3,4-dicarboxyphenyl) ether unit, and an aromatic diamine unit consisting essentially of at least one of 1,3-bis(4-aminophenoxy)benzene, 1,4-diaminobenzene, 4,4'-diaminodiphenyl ether, 1,3-bis(3-aminophenoxy)benzene, 4,4'-bis(4-aminophenoxy)diphenylsulfone and 2,2-bis(4-aminophenoxyphenyl)propane.

7. The aromatic polyimide article of claim 1, wherein the amorphous aromatic polyimide layer comprises an aromatic tetracarboxylic acid unit at least 70 molar % of which is 2,3,3',4'-biphenyltetracarboxylic acid unit and an aromatic diamine unit selected from the group consisting of 1,3-bis(4-aminophenoxy)benzene, 1,4-diaminobenzene, 4,4'-diaminodiphenyl ether, 4,4'-bis(4-aminophenoxy)diphenylsulfone and 2,2-bis(4-aminophenoxyphenyl)propane.

8. The aromatic polyimide article of claim 1, which is prepared by coating a solution of an aromatic polyamide acid from which the amorphous polyimide is produced, on a self-supporting article of an aromatic polyamide acid from which the crystalline polyimide is produced, to form a coated article, and heating the coated article to convert both polyamide acids into polyimides.

9. A composite composed of an aromatic polyimide article having a thickness of not less than 10 μm and comprising a crystalline aromatic polyimide article and an amorphous aromatic polyimide layer coated on the crystalline polyimide article, said amorphous polyimide layer having a thickness of 0.1 to 1.0 μm and having an aromatic tetracarboxylic acid unit which differs from an aromatic tetracarboxylic acid unit of the crystalline aromatic polyimide article, and a metal film formed on the amorphous polyimide layer by vacuum deposition or sputtering.

10. A composite composed of an aromatic polyimide article having a thickness of not less than 10 μm and comprising a crystalline aromatic polyimide article and an amorphous aromatic polyimide layer coated on the crystalline polyimide article, said amorphous polyimide layer having a thickness of 0.1 to 1.0μm and having an aromatic tetracarboxylic acid unit which differs from an aromatic tetracarboxylic acid unit of the crystalline aromatic polyimide article, and a metal film placed on the vamorphous polyimide layer via an adhesive layer.

* * * * *